United States Patent
Stein et al.

(10) Patent No.: US 10,586,169 B2
(45) Date of Patent: Mar. 10, 2020

(54) COMMON FEATURE PROTOCOL FOR COLLABORATIVE MACHINE LEARNING

(71) Applicant: LinkedIn Corporation, Mountain View, CA (US)

(72) Inventors: David J. Stein, Mountain View, CA (US); Xu Miao, Sunnyvale, CA (US); Lance M. Wall, San Francisco, CA (US); Joel D. Young, Milpitas, CA (US); Eric Huang, San Francisco, CA (US); Songxiang Gu, Sunnyvale, CA (US); Da Teng, Sunnyvale, CA (US); Chang-Ming Tsai, Fremont, CA (US); Sumit Rangwala, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 761 days.

(21) Appl. No.: 15/046,199

(22) Filed: Feb. 17, 2016

(65) Prior Publication Data
US 2017/0109652 A1     Apr. 20, 2017

Related U.S. Application Data

(60) Provisional application No. 62/242,799, filed on Oct. 16, 2015.

(51) Int. Cl.
*G06N 20/00*     (2019.01)
(52) U.S. Cl.
CPC .................... *G06N 20/00* (2019.01)
(58) Field of Classification Search
USPC .......................................... 706/12
See application file for complete search history.

(56) References Cited

U.S. PATENT DOCUMENTS

| | | | | |
|---|---|---|---|---|
| 6,233,575 | B1* | 5/2001 | Agrawal | G06F 17/3071 |
| 9,009,088 | B2* | 4/2015 | Wilson | G06N 3/063 |
| | | | | 706/15 |
| 9,064,212 | B2* | 6/2015 | Bruckhaus | G06N 7/02 |
| 9,449,336 | B2* | 9/2016 | Wilson | G06N 3/063 |
| 9,626,443 | B2* | 4/2017 | Fan | G06F 16/248 |
| 9,626,654 | B2* | 4/2017 | Tang | G06Q 10/1053 |
| 9,665,551 | B2* | 5/2017 | Zhuang | G06N 7/005 |
| 9,715,486 | B2* | 7/2017 | Zhuang | G06N 7/005 |

(Continued)

OTHER PUBLICATIONS

IEEE Research on distributed computing of EAI Platform System Ping Xu ; Kun Luo Published in: The Fourth International Workshop on Advanced Computational Intelligence Date of Conference: Oct. 19-21, 2011 pp. 7-11 IEEE.*

*Primary Examiner* — Michael B Holmes
(74) *Attorney, Agent, or Firm* — Park, Vaughan, Fleming & Dowler LLP; Chia-Hsin Suen (57) ABSTRACT

The disclosed embodiments provide a system for processing data. During operation, the system obtains a hierarchical representation containing a set of namespaces of a set of features shared by a set of statistical models. Next, the system uses the hierarchical representation to obtain, from one or more execution environments, a subset of the features for use in calculating the derived feature. The system then applies a formula from the hierarchical representation to the subset of the features to produce the derived feature. Finally, the system provides the derived feature for use by one or more of the statistical models.

20 Claims, 6 Drawing Sheets

(56) References Cited

U.S. PATENT DOCUMENTS

| | | | |
|---|---|---|---|
| 9,720,672 B2* | 8/2017 | Lipton | G06F 9/445 |
| 9,747,365 B2* | 8/2017 | Singh | G06F 16/3329 |
| 9,864,430 B2* | 1/2018 | Wu | G06F 3/013 |
| 10,048,749 B2* | 8/2018 | Miao | G06K 9/033 |
| 10,063,570 B2* | 8/2018 | Muddu | G06F 16/254 |
| 10,120,876 B2* | 11/2018 | Desineni | G06F 16/1748 |
| 10,146,785 B2* | 12/2018 | Desineni | G06F 16/1748 |
| 10,380,129 B2* | 8/2019 | Golland | H04L 67/22 |
| 10,380,500 B2* | 8/2019 | Miao | G06F 8/71 |
| 2001/0037324 A1* | 11/2001 | Agrawal | G06F 17/3071 |
| 2014/0279762 A1* | 9/2014 | Xaypanya | G06N 3/08 706/12 |
| 2017/0091651 A1* | 3/2017 | Miao | G06F 8/71 |
| 2017/0091652 A1* | 3/2017 | Miao | G06N 99/005 |
| 2017/0109652 A1* | 4/2017 | Stein | G06N 20/00 |
| 2018/0046780 A1* | 2/2018 | Graiver | G16H 10/60 |
| 2018/0121311 A1* | 5/2018 | Gong | G06F 11/3495 |
| 2018/0123918 A1* | 5/2018 | Steinhauser | G06F 9/4831 |
| 2018/0285759 A1* | 10/2018 | Wood | G06F 15/76 |
| 2019/0188243 A1* | 6/2019 | Sun | G06F 17/18 |
| 2019/0228343 A1* | 7/2019 | Gu | G06N 20/00 |
| 2019/0324765 A1* | 10/2019 | Tsai | G06F 9/4484 |
| 2019/0325351 A1* | 10/2019 | Stein | G06N 20/00 |
| 2019/0325352 A1* | 10/2019 | Tsai | G06F 16/282 |

\* cited by examiner

COMMON FEATURE PROTOCOL FOR COLLABORATIVE MACHINE LEARNING

RELATED APPLICATION

This application claims priority under 35 U.S.C. section 119(e) to U.S. Provisional Application Ser. No. 62/242,799, entitled "Declarative Namespace System," by inventors David J. Stein, Xu Miao, Lance Wall, Joel D. Young, Eric Huang, Songxiang Gu, Darren Teng and Chang-Ming Tsai, filed on 16 Oct. 2015.

BACKGROUND

Field

The disclosed embodiments relate to collaborative machine learning. More specifically, the disclosed embodiments relate to techniques for providing a common feature protocol for collaborative machine learning.

Related Art

Analytics may be used to discover trends, patterns, relationships, and/or other attributes related to large sets of complex, interconnected, and/or multidimensional data. In turn, the discovered information may be used to gain insights and/or guide decisions and/or actions related to the data. For example, business analytics may be used to assess past performance, guide business planning, and/or identify actions that may improve future performance.

To glean such insights, large data sets of features may be analyzed using regression models, artificial neural networks, support vector machines, decision trees, naïve Bayes classifiers, and/or other types of statistical models. The discovered information may then be used to guide decisions and/or perform actions related to the data. For example, the output of a statistical model may be used to guide marketing decisions, assess risk, detect fraud, predict behavior, and/or customize or optimize use of an application or website.

However, significant time, effort, and overhead may be spent on feature selection during creation and training of statistical models for analytics. For example, a data set for a statistical model may have thousands to millions of features, including features that are created from combinations of other features, while only a fraction of the features and/or combinations may be relevant and/or important to the statistical model. At the same time, training and/or execution of statistical models with large numbers of features typically require more memory, computational resources, and time than those of statistical models with smaller numbers of features. Excessively complex statistical models that utilize too many features may additionally be at risk for overfitting.

Additional overhead and complexity may be incurred during sharing and organizing of feature sets. For example, a set of features may be shared across projects, teams, or usage contexts by denormalizing and duplicating the features in separate feature repositories for offline and online execution environments. As a result, the duplicated features may occupy significant storage resources and require synchronization across the repositories. Each team that uses the features may further incur the overhead of manually identifying features that are relevant to the team's operation from a much larger list of features for all of the teams.

Consequently, creation and use of statistical models in analytics may be facilitated by mechanisms for improving the sharing and reuse of features among the statistical models.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
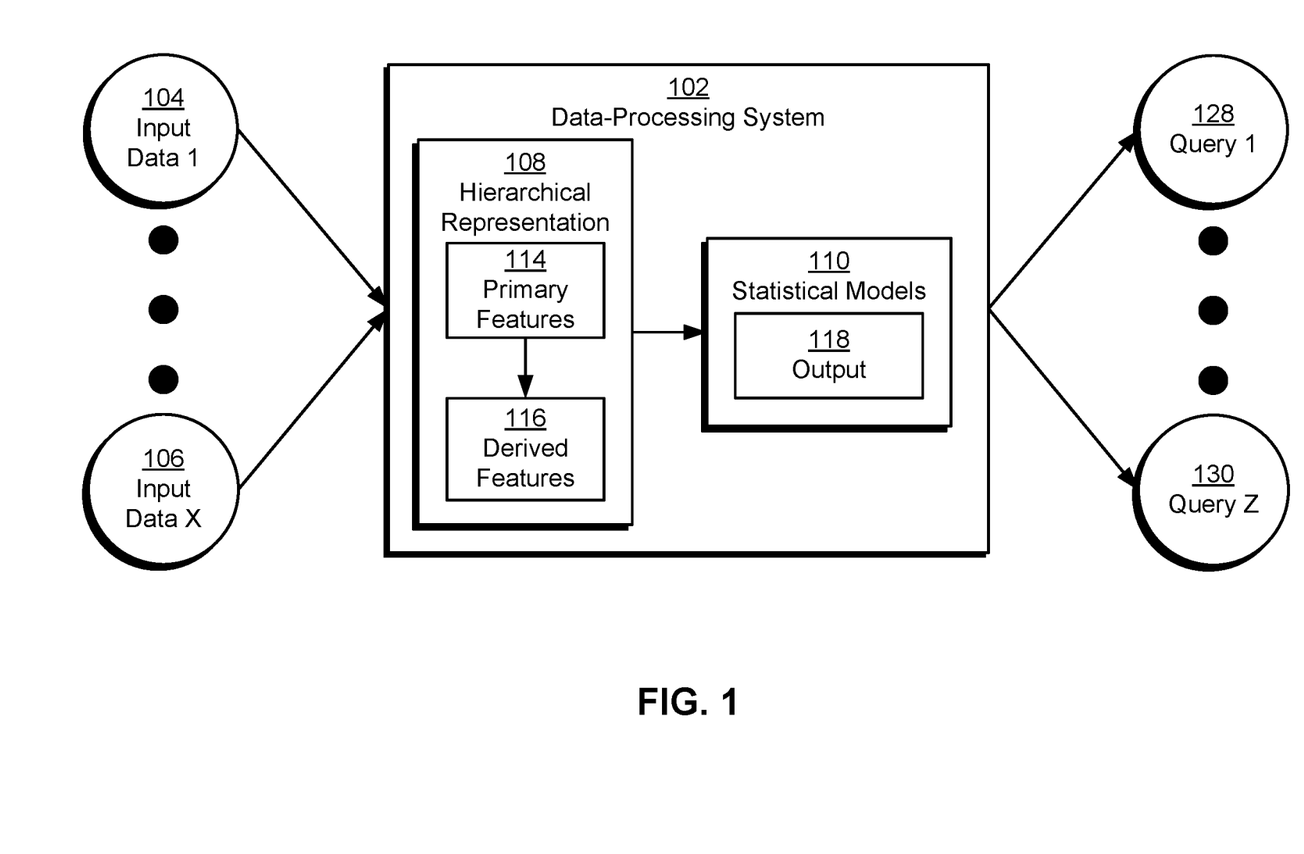
FIG. 1 shows a schematic of a system in accordance with the disclosed embodiments.

The disclosed embodiments provide a method, apparatus, and system for processing data. As shown in FIG. 1, the system may be a data-processing system 102 that analyzes one or more sets of input data (e.g., input data 1 104, input data x 106) to discover relationships, patterns, and/or trends in the input data; gain insights from the input data; and/or guide decisions and/or actions related to the input data.

The results from such data analysis may be provided in responses to queries (e.g., query 1 128, query z 130) of data-processing system 102. For example, data-processing system 102 may create and train one or more statistical models 110 for analyzing input data related to users, organizations, applications, job postings, purchases, electronic devices, websites, content, sensor measurements, and/or other categories. The statistical models may include, but are not limited to, regression models, artificial neural networks, support vector machines, decision trees, naïve Bayes classifiers, Bayesian networks, hierarchical models, and/or ensemble models.

The results of such analysis may be used to discover relationships, patterns, and/or trends in the data; gain insights from the input data; and/or guide decisions or actions related to the data. For example, data-processing system 102 may use the statistical models to generate output 118 that includes scores, classifications, recommendations, estimates, predictions, and/or other properties. Output 118 may be inferred or extracted from primary features 114 in the input data and/or derived features 116 that are generated from primary features 114 and/or other derived features. For example, primary features 114 may include profile data, user activity, sensor data, and/or other data that is extracted directly from fields or records in the input data. The primary features 114 may be aggregated, scaled, combined, and/or otherwise transformed to produce derived features 116, which in turn may be further combined or transformed with one another and/or the primary features to generate additional derived features. After output 118 is generated from one or more sets of primary and/or derived features, output 118 may be queried and/or used to improve revenue, interaction with the users and/or organizations, use of the applications and/or content, and/or other metrics associated with the input data.

In addition, data-processing system 102 may use a hierarchical representation 108 of features 114 and derived features 116 to organize the sharing, production, and use of the features across different teams, execution environments, and/or projects. As described in further detail below, hierarchical representation 108 may include a directed acyclic graph (DAG) that defines a set of namespaces for primary features 114 and derived features 116. The namespaces may disambiguate among features with similar names or definitions from different usage contexts or execution environments. Hierarchical representation 108 may include additional information that can be used to locate primary features 114 in different execution environments, calculate derived features 116 from the primary features and/or other derived features, and track the development of statistical models or applications that accept the derived features as input. Consequently, data-processing system 102 may implement, in hierarchical representation 108, a common feature protocol that describes a feature set in a centralized and structured manner, which in turn can be used to coordinate large-scale collaborative machine learning across multiple entities and statistical models.

Figure 2:
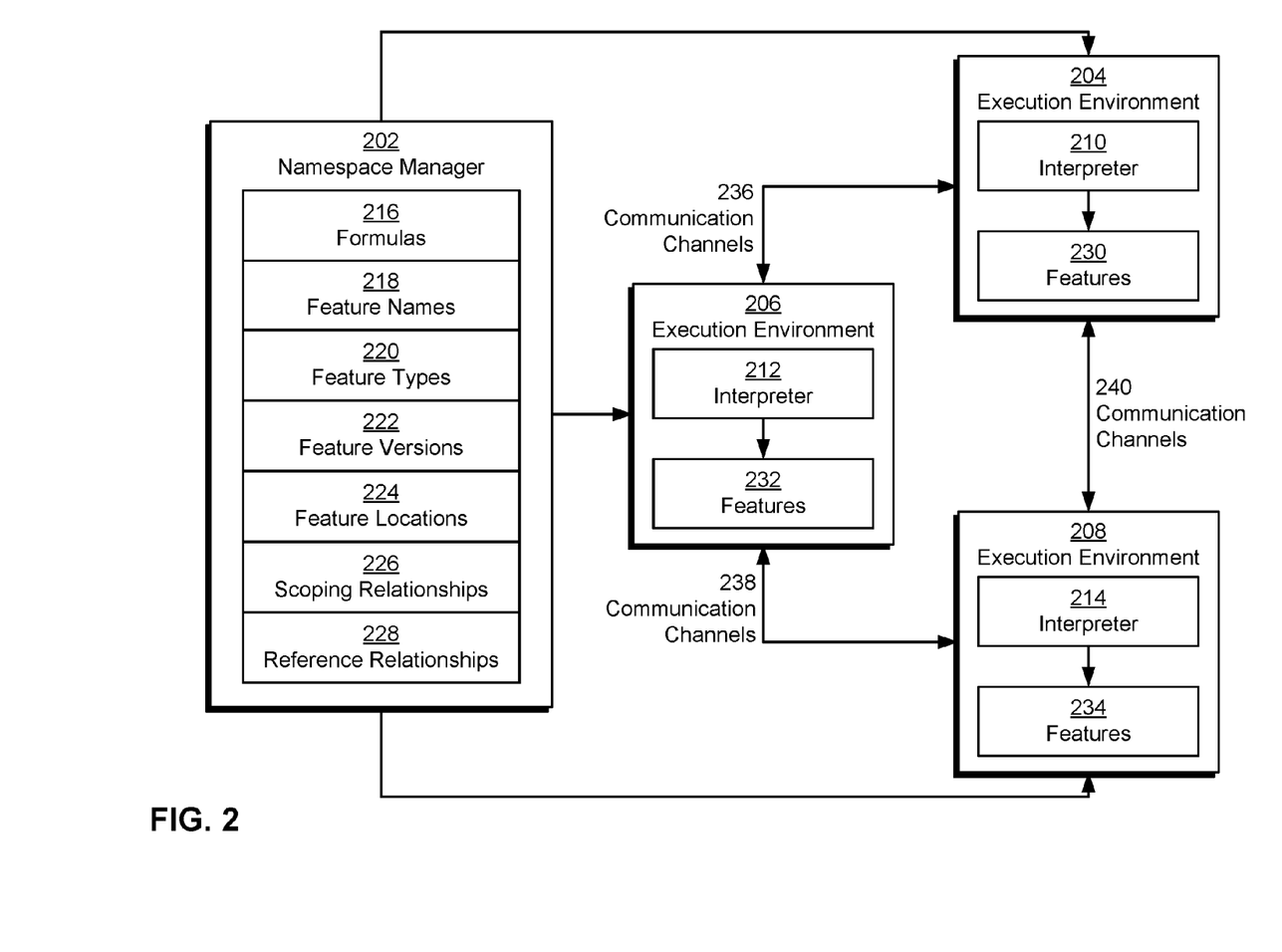
FIG. 2 shows a system for processing data in accordance with the disclosed embodiments.

FIG. 2 shows a system for processing data, such as data-processing system 102 of FIG. 1, in accordance with the disclosed embodiments. The system includes a namespace manager 202 and a number of interpreters 210-214 executing in different execution environments 204-208. Each of these components is described in further detail below.

Namespace manager 202 may maintain a hierarchical representation (e.g., hierarchical representation 108 of FIG. 1) of a set of features 230-234 that is collaboratively used in machine learning by multiple execution environments 204-208, statistical models, teams, projects, and/or other entities. For example, namespace manager 202 may include a database, data store, messaging service, and/or another mechanism that stores structured data representing the hierarchical representation and transmits the hierarchical representation to other components of the system.

The hierarchical representation may allow the features to be declaratively defined, organized, located, shared, generated, and/or otherwise used by the entities to perform collaborative machine learning. As shown in FIG. 2, the hierarchical representation may include feature names 218, feature types 220, feature versions 222, feature locations 224, scoping relationships 226, reference relationships 228, and formulas 216 related to features 230-234. Feature names 218 may include alphanumeric and/or human-readable identifiers for the features. For example, feature names 218 for features related to a user in an online professional network may include, but are not limited to, "age," "location," "industry," "gender," "title," "summary," "skills," "seniority," and/or "connections."

Feature types 220 may identify the data types associated with the features. For example, a feature representing a user's age may have a feature type of "integer," a feature representing the user's gender may have a feature type of "enum { male, female }," and a feature representing a user's title may have a feature type of "string."

Feature versions 222 may be used to track the development of statistical models, projects, and/or applications that use the features. For example, a given feature may have a numeric feature version that matches a version number of a statistical model and/or application that uses the feature. As a result, feature versions 222 may be managed along with changes to components that use the features using a version control system.

Feature locations 224 may represent execution environments 204-208 and/or other places from which the features can be obtained. For example, a location of a feature may specify a path of a directory containing the feature, the name of an execution environment or host used to produce the feature, and/or a database table in which the feature is stored.

As mentioned above, the hierarchical representation may include a DAG that defines a set of namespaces for features 230-234. In particular, the namespaces may be specified using a set of scoping relationships 226 between pairs of the features. Each scoping relationship may be a directed edge from a first feature to a second feature, which indicates that the first feature is to be included in the namespace of the second feature. For example, a scoping relationship from a feature named "member" to a feature named "title" may indicate that "member" is to be appended to the end of a first namespace for "title." Another directed edge from a feature named "job" to a feature named "title" may indicate that "job" is to be appended to the end of a second namespace for "title," thus disambiguating between the two features that share the name of "title." Consequently, scoping relationships 226 may provide context that allows features from different teams, projects, and/or execution environments to be shared and managed in a uniform, central manner.

The DAG may also include a set of reference relationships 228 that define the creation of derived features (e.g., derived features 116 of FIG. 1) from primary features (e.g., primary features 114 of FIG. 1) and/or other derived features. Each reference relationship may include a directed edge from a feature to a derived feature, which represents a dependency of the derived feature on the feature. The reference relationships may thus identify and locate a number of features that are used to calculate a given derived feature. For example, reference relationships from two features named "job" and "skills" to a feature named "job-skills" may indicate that "job-skills" is to be derived or calculated from "job" and "skills."

In turn, formulas 216 may be applied to one or more features with reference relationships to a derived feature to calculate the derived feature. Formulas 216 may include mathematical formulas and/or other types of transformations that are described using lambda calculus, first-order logic, regular expressions, and/or another formal system or formal language. Continuing from the above example, the "job-skills" feature may be associated with a mathematical formula that specifies the calculation of the feature as a cross product of the "job" and "skills" features. To calculate the "job-skills" feature, the mathematical formula and feature locations 224 of "job" and "skills" may be obtained from the hierarchical representation, and the cross product may be applied to the values of "job" and "skills" to produce a value for the "job-skills" feature. Hierarchical representations of feature sets for collaborative machine learning are described in further detail below with respect to FIG. 3.

As described above, the system of FIG. 2 may be used to perform collaborative machine learning in multiple execution environments 204-208. More specifically, the hierarchical representation of features provided by namespace manager 202 may be used by interpreters 210-214 in the execution environments to produce and/or consume features 230-234 for machine learning.

Each execution environment may include a separate set of hardware and/or software components that provide services, resources, and/or features (e.g., features 230-234) for machine learning, statistical model execution, and/or data processing. For example, execution environments 204-208 may include a batch execution environment that performs distributed batch processing and storage of large data sets. In a second example, the execution environments may include an online execution environment that performs real-time or near real-time (e.g., with a delay of a few seconds) processing of one or more feature sets in response to queries related to the feature sets. In a third example, the execution environments may include a stream-processing environment that processes streams of input data as the input data is collected or received from end users, sensors, servers, electronic devices, and/or other data sources. In a fourth example, the execution environments may include a web-based execution environment that provides features and/or other resources through RESTful and/or other types of web services.

An interpreter within a given execution environment may obtain one or more portions of the hierarchical representation from namespace manager 202. For example, the interpreter may query namespace manager 202 for portions of the DAG related to features used by statistical models in the same execution environment. Alternatively, the interpreter may obtain a portion or the entirety of the DAG from one or more files provided by namespace manager 202.

Next, the interpreter may use information from the hierarchical representation and one or more communication channels 236-240 with interpreters in other execution environments to obtain features that may be used, directly or indirectly, by statistical models in the same execution environment. For example, the interpreter may use features from other execution environments as input to one or more statistical models in the same execution environment and/or to calculate a derived feature that is then provided as input to the statistical model(s).

To obtain a given feature, the interpreter may parse the hierarchical representation to identify another execution environment as a feature location of the feature. Next, the interpreter may use a dedicated communication channel (e.g., communication channels 236-240) with another interpreter in the identified execution environment to extract data for the feature from the execution environment. For example, the interpreter may use an application-programming interface (API) with the other interpreter to request and receive the feature from the other execution environment. Conversely, the other interpreter may use a separate API with the interpreter to request and receive features from the interpreter's execution environment for use by statistical models in the other execution environment. In other words, a separate communication channel may be used for each direction of communication between each pair of interpreters 210-214 in two different execution environments 204-208.

Information in the hierarchical representation may additionally be used by the interpreter to calculate a derived feature from the obtained features. First, the interpreter may use reference relationships 228 in the hierarchical representation to identify a number of features for use in producing the derived feature. Next, the interpreter may use feature locations 224 of the identified features and one or more communication channels 236-240 to extract the identified features from the corresponding execution environments and/or storage mechanisms. The interpreter may then apply a formula (e.g., formulas 216) from the hierarchical representation to the extracted features to produce the derived feature. Finally, the interpreter may provide the derived feature for use by one or more statistical models in the same execution environment and/or in other execution environments. For example, the interpreter may store the derived feature in a file, database record, and/or other unit of storage for retrieval and use by statistical models in the same execution environment. The interpreter may also receive, through communication channels 236-240, requests for the derived feature from interpreters in other execution environments and provide the derived feature in responses to the requests.

Prior to calculating the derived feature from the extracted features, the interpreter may use features types 220 of the extracted features to verify a compatibility of the extracted features in producing the derived feature. More specifically, the interpreter may obtain the feature types from the hierarchical representation and compare the feature types to a set of valid feature types associated with the formula used to calculate the derived feature to determine if the extracted features can be used to produce a meaningful value for the derived feature. For example, the interpreter may verify that two input feature vectors share the same feature types before calculating a cosine similarity from the feature vectors. In another example, the interpreter may verify that one or more input features have a "string" feature type before concatenating the input features, applying a regular expression to the input features, and/or performing other string-based operations using the input features.

By providing a declarative, namespaced representation of a feature set in the common feature protocol, the system of FIG. 2 may decouple the modeling of data in the feature set from processing of the data in various execution environments 204-208. As a result, data modelers may add or modify feature descriptions in the common feature protocol independently of the environment-specific production and consumption of the features by data engineers. In turn, the common feature protocol may reduce the complexity and improve the scalability of large-scale machine learning over conventional mechanisms that organize and manage separate sets of features for use in different execution environments. The uniform, logical organization of the feature set in the common feature protocol may further improve reusability and collaboration by allowing different teams to share common feature data and statistical models without requiring the feature data or statistical models to be aggregated and/or stored in a centralized location.

Those skilled in the art will appreciate that the system of FIG. 2 may be implemented in a variety of ways. First, namespace manager 202 and interpreters 210-214 may be provided by a single physical machine, multiple computer systems, one or more virtual machines, a grid, one or more databases, one or more filesystems, and/or a cloud computing system. One or more instances of an interpreter may run in each execution environment to exchange features with interpreters in other execution environments and/or generate derived features from the exchanged features, with the number of instances selected to accommodate the processing needs of the execution environment and/or requests for features from interpreters in other execution environments.

Second, data in the hierarchical representation and/or features 230-234 may be created, stored, and/or transmitted in a number of formats. For example, the hierarchical representation and/or features may be included in database records, property lists, Extensible Markup language (XML) documents, JavaScript Object Notation (JSON) objects, and/or other types of structured data.

Figure 3:
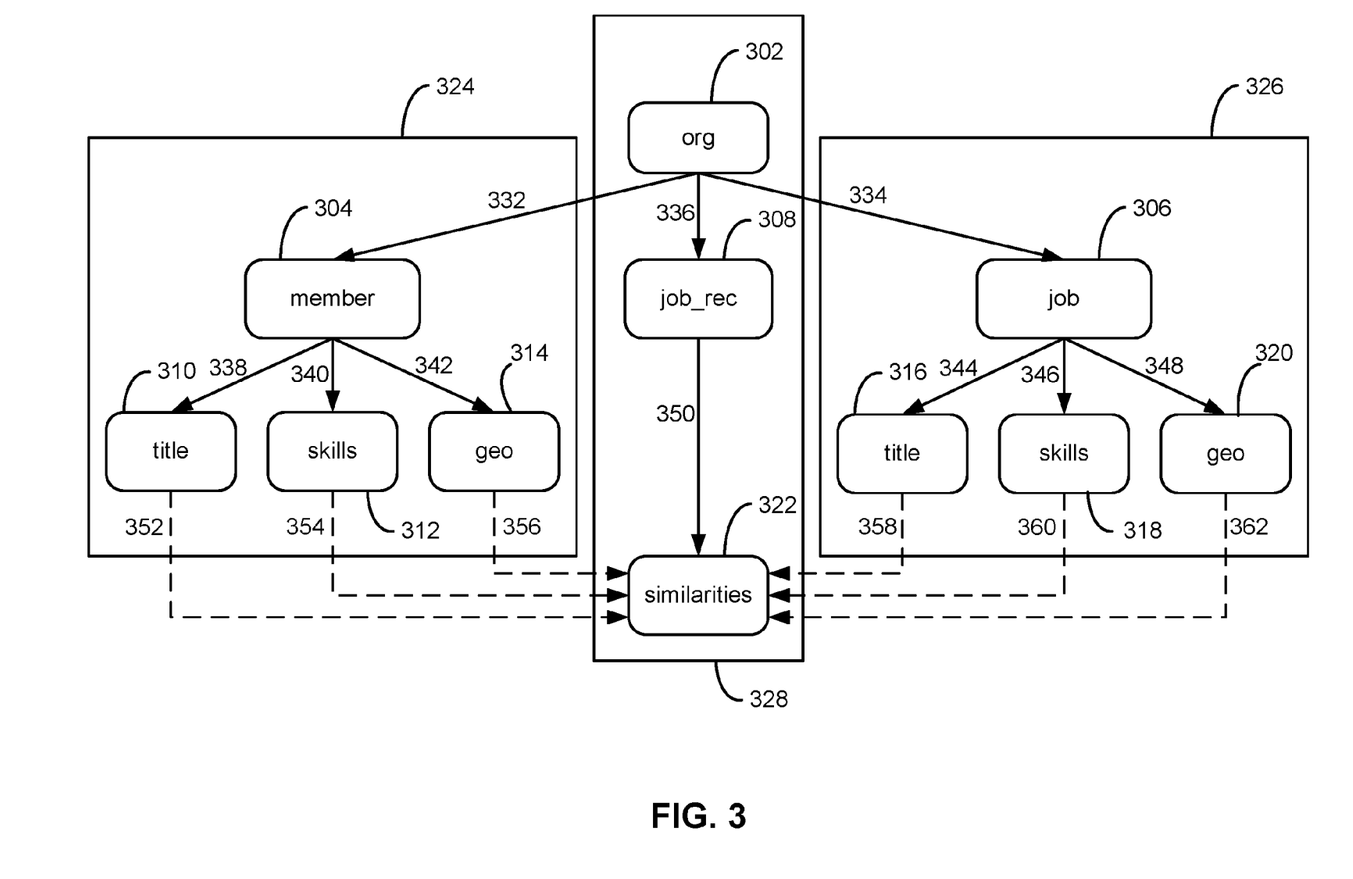
FIG. 3 shows an exemplary hierarchical representation of features in a common feature protocol in accordance with the disclosed embodiments.

FIG. 3 shows an exemplary hierarchical representation of features in a common feature protocol in accordance with the disclosed embodiments. As shown in FIG. 3, the common feature protocol may be represented as a DAG that includes a set of nodes 302-322 representing the features and a set of directed edges 332-362 between pairs of the nodes.

Node 302 functions as the root of the DAG and is included in the namespace of every other node in the hierarchical representation. For example, the name of node 302 (e.g., "org") may be placed at the beginning of the namespaces of all other nodes 304-322 in the DAG.

Nodes 304-308 may be connected directly to node 302 via edges 332-336. Edges 332-336 represent scoping relationships between node 302 and nodes 304-308, indicating that "org" forms the namespace of nodes 304-308 with names of "member," "job," and "job_rec," respectively. As a result, nodes 304-308 have fully namespaced names of "org.member," "org.job," and "org.job_rec," respectively.

Nodes 310-314 may be connected directly to node 304 via edges 338-342. Edges 338-342 represent scoping relationships between node 304 and nodes 310-314, resulting in a namespace of "org.member" for nodes 310-314 with names of "title," "skills," and "geo." In turn, nodes 310-314 have fully namespaced names of "org.member.title," "org.member.skills," and "org.member.geo," respectively.

Similarly, edges 344-348 represent scoping relationships between node 306 and nodes 316-320, resulting in a namespace of "org.job" for nodes 316-320 with the same names of "title," "skills," and "geo" as those of nodes 310-314. The fully namespaced names of "org.job.title," "org.job.skills," and "org.job.geo" for nodes 316-320 may thus be used to disambiguate between features represented by nodes 310-314 and features represented by nodes 316-320, which are under a different namespace of "org.member."

Edge 350 may represent a scoping relationship between node 308 and node 322. Node 322 may thus have a name of "similarities," a namespace of "org.job_rec," and a fully namespaced name of "org.job_rec.similarities."

As described above, the common feature protocol may be used to centrally manage and organize features across multiple execution environments, teams, projects, and/or other entities. For example, nodes 304 and 310-314 may be associated with a grouping 324 representing one entity; nodes 302, 308 and 322 may be associated with a second grouping 328 representing a second entity; and nodes 306 and 316-320 may be associated with a third grouping 326 representing a third entity.

Because features represented by nodes 302-322 are centrally defined using the common feature protocol, information in the common feature protocol may be used to share the features across the entities. For example, a feature represented by node 316 may include the following compact definition:

ranker::org.job.title.2.3.1

In the above definition, "ranker" represents an execution environment from which the feature may be obtained, "org.job.title" is the fully namespaced name of node 322, and "2.3.1" is the version of the feature. As a result, an interpreter in a different execution environment may use a communication channel with the "ranker" execution environment to request the "org.job.title.2.3.1" feature, include the feature in input to a statistical model, and/or use the feature to calculate a derived feature.

Nodes 310-320 are additionally connected to node 322 by edges 352-362. Unlike edges 332-350, edges 352-362 represent reference relationships that are used to define the calculation of a derived feature represented by node 322 from features represented by nodes 310-320. For example, edges 352-362 and other information in the hierarchical representation may indicate the calculation of the derived feature as a cosine similarity between three pairs of features named "org.member.title" and "org.job.title," "org.member.skills" and "org.job.skills," and "org.member.geo" and "org.job.geo." Moreover, edges 352-362 and the calculation of the feature represented by node 322 may be defined using the following:

```
{
    "type" : "laser.java.class",
    "name" : "org.job_rec.similarities",
    "version" : "2.3.1",
    "location" : "laser"
    "parameters" : {
        a = {"org.member.title", "org.member.skills",
            "org.member.geo"}
        b = {"org.job.title", "org.job.skills",
            "org.job.geo"}
        return cosine_similarity(a, b)
    }
}
```

The above definition includes a feature type of "laser.java.class," a fully namespaced name of "org.job_rec.similarities," a version of "2.3.1," and a location (e.g., execution environment) of "laser." A set of "parameters" is used to define the calculation of the feature as a cosine similarity of two vectors, with the first vector containing features represented by nodes 310-314 and the second vector containing features represented by nodes 316-320. The "parameters" in the definition may also be used to verify a compatibility of feature types in the first and second vectors as input to the cosine similarity before the derived feature is calculated. For example, the feature types of the three pairs of features represented by "org.member.title" and "org.job.title," "org.member.skills" and "org.job.skills," and "org.member.geo" and "org.job.geo" may be verified to be the same before the cosine similarity is applied to two vectors "a" and "b" that contain the features.

Figure 4:
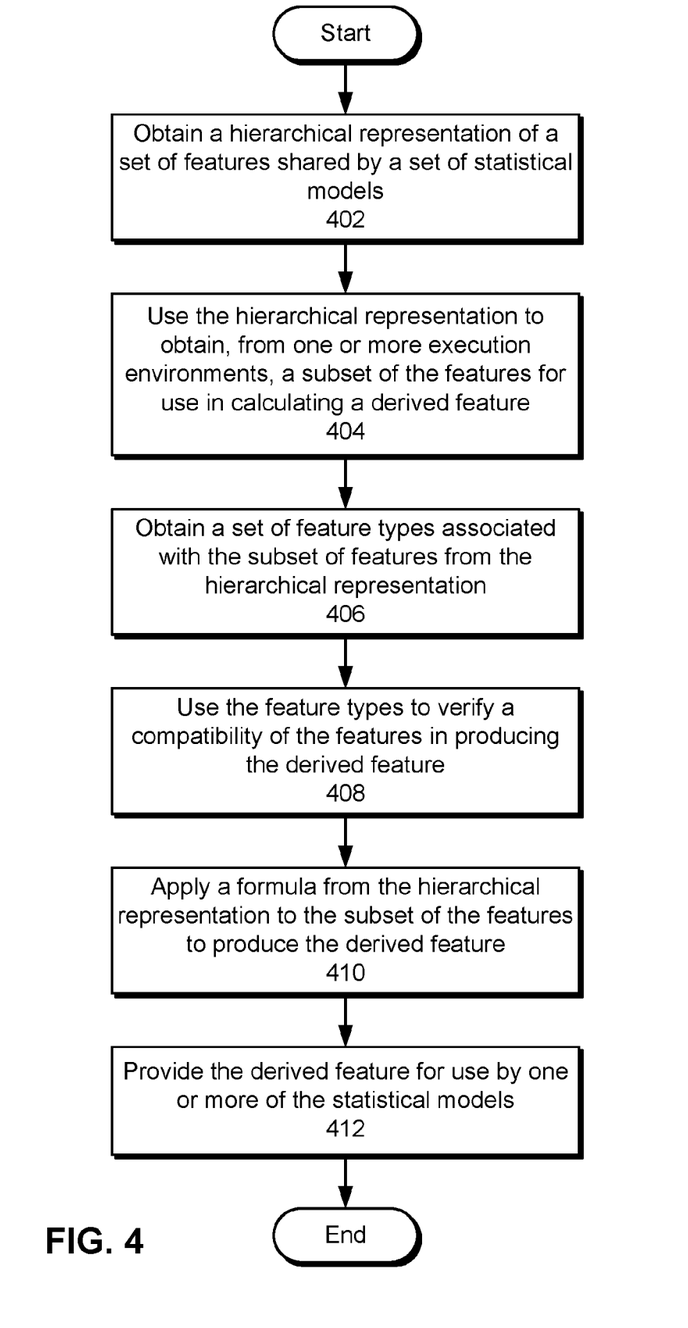
FIG. 4 shows a flowchart illustrating the processing of data in accordance with the disclosed embodiments.

FIG. 4 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a hierarchical representation of a set of features shared by a set of statistical models is obtained (operation 402). The hierarchical representation may include a DAG that defines a set of namespaces for the features and/or additional relationships among the features. The DAG may include a set of nodes representing the features and a set of scoping relationships represented by directed edges between pairs of the nodes, such that a feature from which a directed edge originates is included in the namespace of another feature at which the directed edge terminates. The DAG may also include a set of reference relationships that are also represented by directed edges between pairs of the nodes, such that a feature from which a directed edge originates is used to calculate a derived feature at which the directed edge terminates. The DAG may further include feature names, feature versions, and/or feature types of the features, as well as formulas for calculating the derived feature from other features.

Next, the hierarchical representation is used to obtain, from one or more execution environments, a subset of the features for use in calculating the derived feature (operation 404), as described in further detail below with respect to FIG. 5. A set of feature types associated with the subset of features is also obtained from the hierarchical representation (operation 406) and used to verify a compatibility of the features in producing the derived feature (operation 408). For example, the feature types may be matched to constraints associated with a mathematical formula or other transformation for producing the derived feature to ensure that the calculation produces a meaningful or valid result.

A formula from the hierarchical representation is then applied to the subset of the features to produce the derived feature (operation 410), and the derived feature is provided for use by one or more of the statistical models (operation 412). For example, the formula may be used to calculate a value of the derived feature from values of the subset of features, and the value of the derived feature may be stored in a file or database record. The value may additionally be transmitted to other execution environments for use by statistical models in the other execution environments. For example, interpreters in the other execution environments may use the hierarchical representation to locate the derived feature and request the derived feature the execution environment in which the derived feature was produced.

Figure 5:
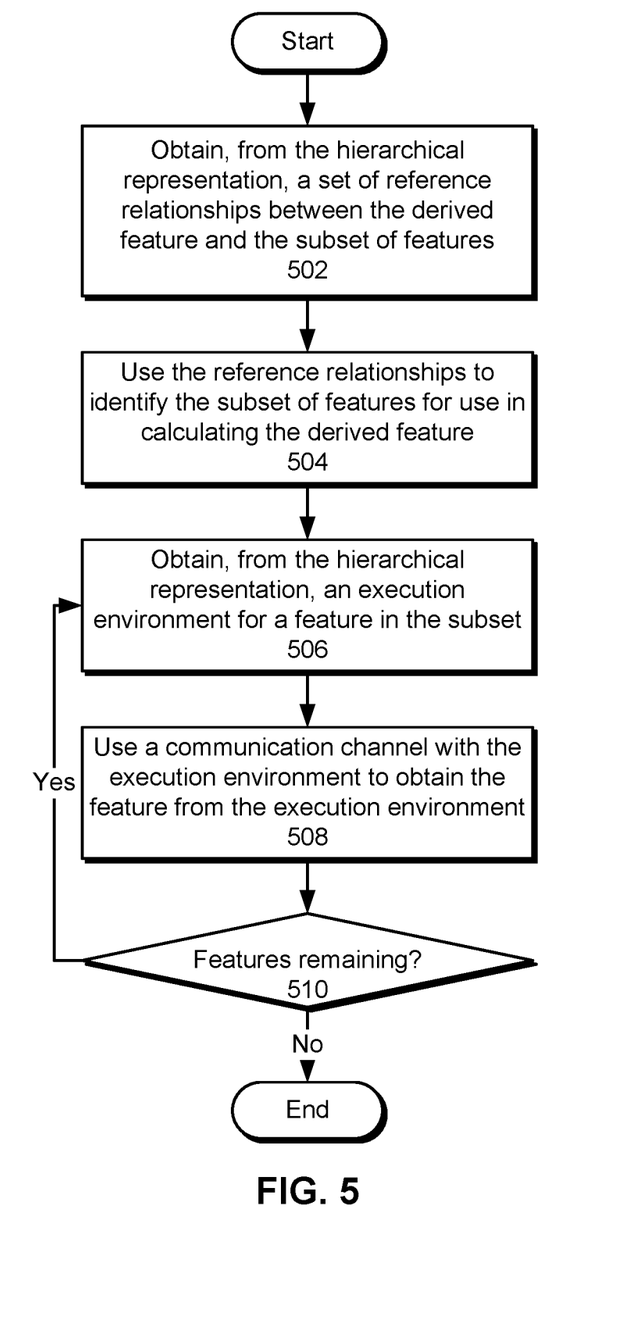
FIG. 5 shows a flowchart illustrating the process of using a hierarchical representation of a set of features to obtain a subset of the features for use in calculating a derived feature in accordance with the disclosed embodiments.

FIG. 5 shows a flowchart illustrating the process of using a hierarchical representation of a feature set to obtain a subset of the features for use in calculating a derived feature in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, a set of reference relationships between the derived feature and the subset of features is obtained from the hierarchical representation (operation 502) and used to identify the subset of features for use in calculating the derived feature (operation 504). As mentioned above, the reference relationships may be directed edges that originate in the subset of the features and terminate in the derived feature. Thus, the hierarchical representation may be parsed or interpreted to obtain the directed edges and identify the subset of the features as input to the calculation of the derived feature.

Next, an execution environment for a feature in the subset is obtained from the hierarchical representation (operation 506), and a communication channel with the execution environment is used to obtain the feature from the execution environment (operation 508). For example, the execution environment may be obtained from the definition of the feature in the hierarchical representation, and an API with the execution environment may be used to request the feature from the execution environment. Operations 506-508 may be repeated for remaining features (operation 510) in the subset until all features in the subset have been received from the corresponding execution environment(s).

Figure 6:
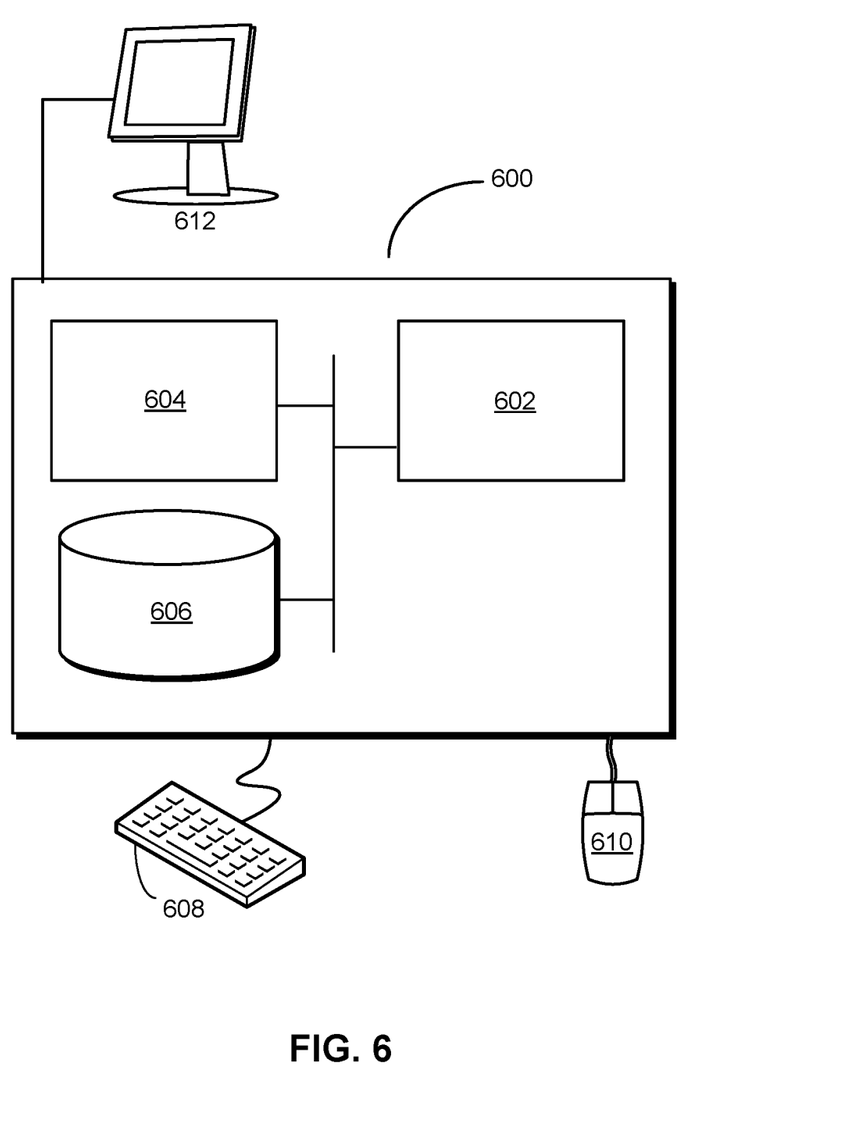
FIG. 6 shows a computer system in accordance with the disclosed embodiments.

FIG. 6 shows a computer system 600 in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for processing data. The system may include a namespace manager that provides a hierarchical representation of a set of features shared by a set of statistical models. The hierarchical representation may include a set of namespaces for the set of features. The system may also include an interpreter in an execution environment associated with one or more of the features. The interpreter may use the hierarchical representation to obtain, from one or more other execution environments, a subset of the features for use in calculating a derived feature. Next, the interpreter may apply a formula from the hierarchical representation to the subset of the features to produce the derived feature. The interpreter may then provide the derived feature for use by one or more of the statistical models.

In addition, one or more components of computer system 600 may be remotely located and connected to the other components over a network. Portions of the present embodiments (e.g., namespace manager, interpreters, execution environments, statistical models, etc.) may also be located on different nodes of a distributed system that implements the embodiments. For example, the present embodiments may be implemented using a cloud computing system that uses a common feature protocol containing a namespace representation of a set of features to perform collaborative machine learning across a set of remote statistical models in the execution environments.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   obtaining a hierarchical representation comprising a set of namespaces of a set of features shared by a set of statistical models; and
   calculating, by one or more computer systems, a derived feature from the set of features by:
   using the hierarchical representation to obtain, from one or more execution environments among a set of execution environments, a subset of the set of features for use in calculating the derived feature; and
   applying a formula from the hierarchical representation to the subset of the set of features to produce the derived feature; and
   providing the derived feature for use by one or more of the statistical models in the set of execution environments, thereby promoting sharing and reusing common features by the set of execution environments during collaborative machine learning.

2. The method of claim 1, wherein calculating the derived feature from the set of features further comprises:
   obtaining, from the hierarchical representation, a set of feature types associated with the subset of the set of features; and
   using the feature types to verify a compatibility of the subset of the set of features in producing the derived feature prior to applying the formula to the subset of the set of features.

3. The method of claim 1, wherein using the hierarchical representation to obtain the subset of the set of features for use in calculating the derived feature comprises:
   obtaining, from the hierarchical representation, a set of reference relationships between the derived feature and the subset of the set of features; and
   using the set of reference relationships to identify the subset of the set of features.

4. The method of claim 3, wherein using the hierarchical representation to obtain the subset of the set of features for use in calculating the derived feature further comprises:
   obtaining, from the hierarchical representation, an execution environment among the set of execution environments for a feature in the subset of set of features; and
   using a communication channel with the execution environment to obtain the feature from the execution environment.

5. The method of claim 3, wherein the set of reference relationships comprises a set of directed edges from the subset of the set of features to the derived feature.

6. The method of claim 1, wherein the hierarchical representation comprises a directed acyclic graph (DAG).

7. The method of claim 1, wherein the hierarchical representation further comprises:
   a set of nodes representing the set of features; and
   a set of scoping relationships between pairs of nodes in the set of nodes, wherein the set of scoping relationships defines the set of namespaces.

8. The method of claim 7, wherein the hierarchical representation further comprises a set of feature names and a set of feature versions for the set of features.

9. The method of claim 7, wherein the set of scoping relationships comprises a directed edge from a first feature in a namespace of a second feature to the second feature.

10. The method of claim 1, wherein the one or more execution environments comprise at least one of:
    a batch execution environment;
    an online execution environment;
    a stream-processing environment; and
    a web-based execution environment.

11. An apparatus, comprising:
    one or more processors; and
    memory storing instructions that, when executed by the one or more processors, cause the apparatus to:
    obtain a hierarchical representation comprising a set of namespaces of a set of features shared by a set of statistical models;
    use the hierarchical representation to obtain, from one or more execution environments among a set of execution environments, a subset of the set of features for use in calculating a derived feature;
    apply a formula from the hierarchical representation to the subset of the set of features to produce the derived feature; and
    provide the derived feature for use by one or more of the statistical models in the set of execution environments, thereby promoting sharing and reusing common features by the set of execution environments during collaborative machine learning.

12. The apparatus of claim 11, wherein calculating the derived feature from the set of features further comprises:
    obtaining, from the hierarchical representation, a set of feature types associated with the subset of the set of features; and
    using the feature types to verify a compatibility of the subset of the set of features in producing the derived feature prior to applying the formula to the subset of the set of features.

13. The apparatus of claim 11, wherein using the hierarchical representation to obtain the subset of the set of features for use in calculating the derived feature comprises:
    obtaining, from the hierarchical representation, a set of reference relationships between the derived feature and the subset of the set of features; and
    using the set of reference relationships to identify the subset of the set of features.

14. The apparatus of claim 13, wherein using the hierarchical representation to obtain the subset of the set of features for use in calculating the derived feature further comprises:
    obtaining, from the hierarchical representation, an execution environment among the set of execution environments for a feature in the subset of the set of features; and
    using a communication channel with the execution environment to obtain the feature from the execution environment.

15. The apparatus of claim 11, wherein the hierarchical representation further comprises:
    a set of nodes representing the set of features; and
    a set of scoping relationships between pairs of nodes in the set of nodes, wherein the set of scoping relationships defines the set of namespaces.

16. The apparatus of claim 15, wherein the hierarchical representation further comprises a set of feature names and a set of feature versions for the set of features.

17. The apparatus of claim 15, wherein the set of scoping relationships comprises a directed edge from a first feature in a namespace of a second feature to the second feature.

18. The apparatus of claim 11, wherein the one or more execution environments comprise at least one of:
    a batch execution environment;
    an online execution environment;

a stream-processing environment; and a web-based execution environment.

19. A system, comprising:

a namespace manager comprising a non-transitory computer-readable medium comprising instructions that, when executed, cause the system to provide a hierarchical representation comprising a set of namespaces of a set of features shared by a set of statistical models; and an interpreter comprising a non-transitory computer-readable medium comprising instructions that, when executed, cause the system to:

use the hierarchical representation to obtain, from one or more execution environments among a set of execution environments, a subset of the set of features for use in calculating a derived feature;

apply a formula from the hierarchical representation to the subset of the set of features to produce the derived feature; and     provide the derived feature for use by one or more of the statistical models in the set of execution environments, thereby promoting sharing and reusing common features by the set of execution environments during collaborative machine learning.

20. The system of claim 19, wherein calculating the derived feature from the set of features further comprises:

obtaining, from the hierarchical representation, a set of feature types associated with the subset of the set of features; and     using the feature types to verify a compatibility of the subset of the set of features in producing the derived feature prior to applying the formula to the subset of the set of features.

\* \* \* \* \*